June 24, 1930.  T. E. THOMAS  1,767,158
ELECTROMAGNETIC ROTARY MOTOR
Filed Dec. 11, 1928    2 Sheets-Sheet 2

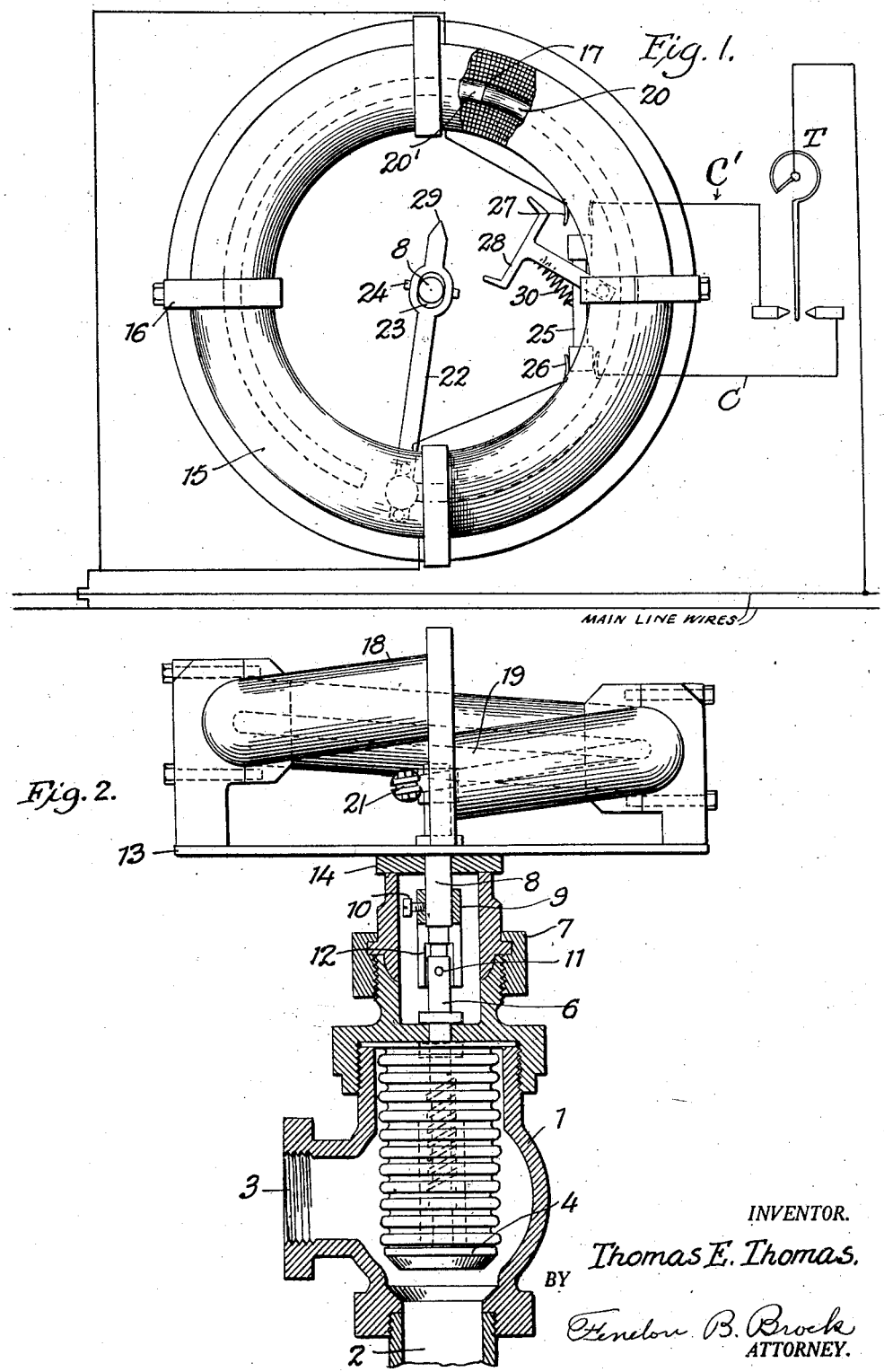

INVENTOR.
Thomas E. Thomas,
BY
Fenelon B. Brock
ATTORNEY.

Patented June 24, 1930

1,767,158

UNITED STATES PATENT OFFICE

THOMAS E. THOMAS, OF OGDEN, UTAH

ELECTROMAGNETIC ROTARY MOTOR

Application filed December 11, 1928. Serial No. 325,339.

My present invention relates to an improved electromagnetic rotary motor which, while adapted for performing its functions in connection with various rotary devices, is especially designed for operating rotary valves employed in steam or hot water heating systems and in the automatic regulation of the heat admitted to a radiator.

In carrying out my invention I am enabled to locate a motor in direct connection with each of the valves for the heat radiators in the heating system and mount the motor on the valve casing. Each motor is included in an electric operating circuit, under separate control of a thermostatic device that may be remotely located, thus providing for an independent, simple and compact arrangement of the heat regulating device for each radiator in the heating system.

The invention consists essentially in applying to and combining with the rotary stem of the valve (or other rotary part of the valve) a rotary motor comprising a circular solenoid of electro-magnet and a complementary armature, whereby, when the solenoid is energized the rotary stem is turned, and means are provided whereby the solenoid operates the valve-stem in alternate directions for opening and closing the valve and thus regulating the passage of the heating medium through the valve casing.

Mechanical means are provided whereby an initial lost motion is provided for, between the valve operating motor and the rotary valve stem in order that a hammer-blow may be applied to the stem. Means are also provided for insuring an axial movement of the valve as well as a rotary movement when the valve is being opened or closed.

The invention consists in certain novel combinations and arrangements of parts as will hereinafter be more fully set forth and claimed.

In the accompanying drawings I have illustrated the electro-magnetic rotary motor in the form of a spirally arranged, circular solenoid, combined with a complementary spirally arranged circular armature, but it will be understood that various alterations and changes may be made in the form or shape of the solenoid and armature within the scope of my claims, without departing from the principles of my invention.

Two adaptations of the physical embodiment of my invention including the operation of a rotary reciprocating screw valve having a rising stem, and of a rotary reciprocable disk valve with a non-rising stem, are illustrated in the drawings, and the parts are combined and arranged according to modes that have thus far been devised for the application of the principles of my invention.

Figure 1 is a plan view, partially in diagram, showing the circular electro-magnetic rotary motor, together with a thermostatic control device in an operating circuit which includes a reversing switch that is mechanically operated by the movement of the motor.

Figure 2 is a view showing in section a rotary reciprocating valve with non-rising stem in open position and equipped with the motor of my invention.

Figure 3:
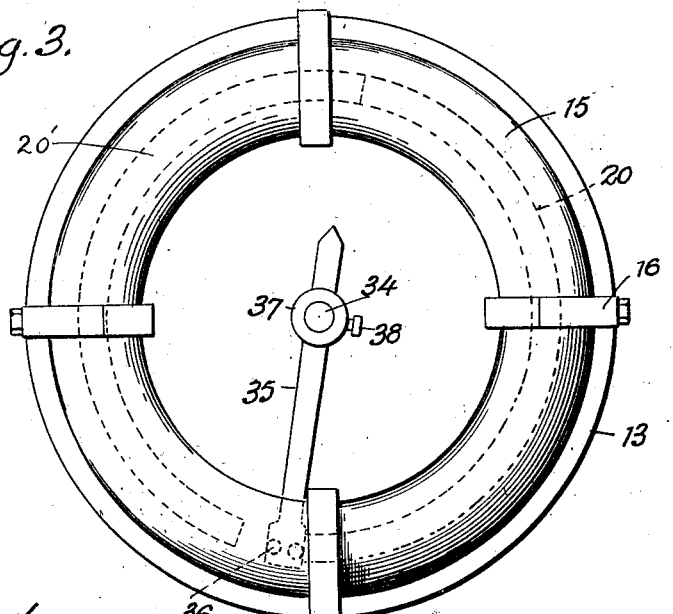
Figure 3 is a top plan view of the motor and Figure 4 is a view showing a rotary disk, or screw valve of another type equipped with the motor of my invention.

In order that the general arrangement and utility of parts may readily be understood I have shown the valve casing 1 with an inlet pipe 2 for steam or hot water supplied from the heating system in usual manner, and an outlet pipe 3 that is connected as usual with a heat radiator.

The valve 4 is of the bellows type and is designed to rotate and reciprocate for closing and opening the usual seat 5. While the valve 4 moves vertically, its rotary, threaded stem 6 is now rising and extends upwardly in the bonnet 7. An extension or shaft 8 which is alined with the stem, projects upwardly through and above the bonnet. Between the stem and the shaft a loose connection is made that provides for an initial lost motion for the purpose of permitting a hammer-blow action that is applied to the stem when the shaft is turned. This loose joint or connection includes a bushing 9 that is secured in rigid adjusted position on the shaft by a set screw 10, and the upper end of the stem, which projects into the bushing, is provided with a transverse pin 11 that co-acts with a slot 12 of the bushing.

Upon the top of the valve casing a base plate 13 is rigidly secured in suitable manner and the shaft has a journal bearing in the base plate and cap 14 of the valve casing.

The electro-magnetic rotary motor which is supported on the base plate is here shown as a spirally arranged solenoid 15, supported by braces 16, and the solenoid is so wound with fine wires about its tubular core 17 that an alternate movement of the armature may be accomplished when induction takes place either at the upper end 18 or at the lower end 19 of the solenoid.

The spiral or circular solenoid is provided with a complementary spiral or circular armature that is movable through a spiral path within the solenoid and in alternate directions. The spiral armature is fashioned of two rigidly joined segments 20 and 20′, the former of non-magnetic metal, as brass, and the latter of magnetic metal. At one end, as 21 the armature has a flexible or ball and socket connection with a radially disposed lever 22, and the lever, which is slotted at 23 to fit over the top end of the shaft 8, is pivoted at 24 to the shaft 8.

In Figure 1 a thermostatic control device is indicated at T and this device alternately opens and closes the electric operating circuits C and C′, which circuits are provided with a reversing electric switch that comprises a slide bolt or bar 25 movable between the pairs of stationary contact points 26 and 27. The slide bolt is shifted longitudinally through the medium of a pivoted cam arm 28 having cam heads that are located in the path of rotary movement of the cam 29, on the end of the radial lever arm 22. As the cam on the lever arm swings in either direction through its rotary path, it encounters one of the cam heads and shifts the cam arm for the purpose of throwing the reversing switch to its opposite location. A spring 30 is provided to snap the cam arm over, after its initial movement is started by the frictional engagement of the cam 29 with one of the cam heads, and the snap spring then retains the cam arm in position.

Figure 4:
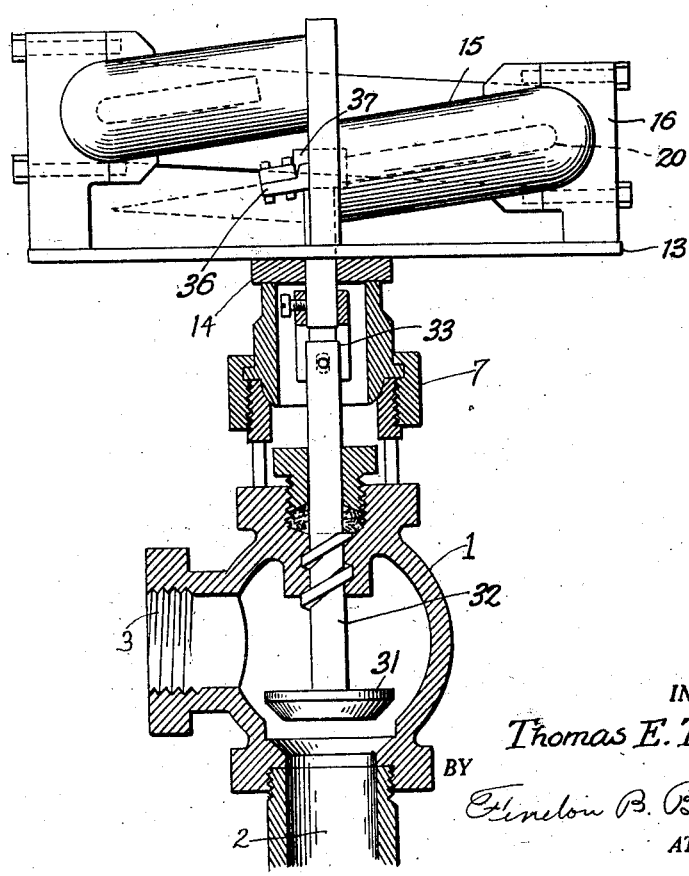

In Figures 3 and 4 another type of valve is illustrated wherein the rotary disk valve 31 turns with its threaded stem 32 and the stem, which has a loose connection, at 33 to insure a hammer-blow to the shaft 34, moves in a vertical plane and rotates with the shaft (except for the loose connection) to permit the lost motion for the hammer blow.

The radial lever arm 35 is fixed at 36 to the circular armature of the solenoid 15, and by means of the collar 37 and set screw 38, the lever arm of the armature is rigidly secured in adjusted position on the shaft 34.

When the thermostat T is influenced by the changing temperature, to close one or the other of the operating circuits C or C′ that portion of the solenoid that is electrically connected through the switch with the operating circuit is magnetized to operate the complementary end of its armature, and the latter is turned about the shaft 8 as a center. Through the radial arm 22 the shaft is turned, and with it the stem of the valve, so that the latter is either lifted from its seat, or closed upon its seat, depending upon the position of the reversing switch. This movement of the valve is accomplished automatically and the passage of hot water or steam through the valve is thus governed to regulate the temperature of the room or other place in which the valve and its radiator are located.

Having thus fully described my invention, what I claim as new and desire to secure by Letters Patent is:

1. An electromagnetic rotary motor comprising a member to be rotated, a spirally arranged circular solenoid and its electric operating circuit, a reversing switch and a control switch in the circuit, a spirally arranged circular armature for the solenoid, and a lever arm between the armature and said member.

2. In a thermostatic temperature control device including a valve and its rotary shaft, of a circular spirally arranged solenoid and a complementary spirally arranged circular armature, a lever connecting said armature and shaft, an electric operating circuit, and a reversing switch in said circuit, for the purpose described.

3. In a thermostatic temperature control device the combination with a valve and its stem, a valve shaft and a loose connection between the shaft and stem to provide for a hammer blow, of a spiral solenoid and its complementary spiral armature, a lever arm between the armature and the shaft, an electric operating circuit for the solenoid and a reversing switch in said circuit.

4. In a thermostatic temperature control device, the combination with a valve and its stem, a valve shaft and a loose connection between the stem and shaft to permit a hammer blow, of a spiral solenoid and its complementary spiral armature, a lever pivoted to the shaft and loosely connected to the armature, an electric operating circuit for the solenoid, a reversing switch in the circuit, and mechanical means actuated by movement of the armature for operating said switch.

In testimony whereof I affix my signature.

THOMAS E. THOMAS.